United States Patent Office 2,748,051
Patented May 29, 1956

2,748,051

METHOD OF TREATING AIR SAC INFECTION IN POULTRY WITH PARA-AMINO-BENZOATE COMPOSITION

Thomas W. Zbornik and Oliver Herdien Peterson, Charles City, Iowa, assignors to Dr. Salsbury's Laboratories, a corporation of Iowa No Drawing. Application April 18, 1952,
Serial No. 283,114

2 Claims. (Cl. 167—53.1)

This invention relates to medicinal compositions useful in the veterinary arts, and more specifically to therapeutic preparations designed for the control of virulent chronic respiratory disease or air sac infection in fowl.

Chronic respiratory disease in its virulent form is a condition which has been but recently discovered as the cause of mounting losses to the poultry industry throughout the nation. It has developed during the last couple of years and in the course of the past winter attained epidemic proportions which have attracted national attention and alerted the leading poultry pathologists of the country and the Bureau of Animal Industry.

The disorder is an apparently unusual variety of the common respiratory disease and its virulence is due to the severity of its symptoms and its high mortality which in some flocks may rise to as high a rate as 75%. Additional financial losses are caused by secondary complications afflicting the birds in a state of utter debility and by the low rate of food conversion resulting in emaciation and an inferior quality of the dressed broiler. Laying flocks register a drop of production rates to a low of 35% and many of them never regain their previous capacity if they overcome the disease.

Air sac infection has been recently characterized as a "sort of hidden enemy," since the illness is of lingering nature and progresses unnoticed until it has spread throughout the air sac of the chicken. The most damaging effect is observed in birds of approximately seven to eight weeks, though both younger and older animals may likewise be affected.

Clinically the disorder may develop at any time after the third week following the infection. The onset is usually slow and of long duration. The principal outward manifestations by which the disease can be readily recognized are a characteristic rasping cough, as well as sneezing and swelling of the nasal sinuses. In addition there is noted a poor growth response to feed consumption and rising mortality. At autopsy the infected birds reveal heavy deposits of a slimy, yellowish exudate on the air sacs, heart and liver. Multiple, small granuloma are frequently found.

Little is known so far about the etiological factor of air sac infection. The pathogenic agent is presently thought to be a virus or virus-like organism. In about one fourth of the cases an agent can be isolated by using the yolk-sac technique with the help of an appropriate antibiotic. The agent is capable of producing sinusitis in chickens and turkeys on intrasinusal injection. Following such injection certain pathological features develop which are similar to those of the original disease. It has also been noticed that the disorder tends to follow a precipitating factor, such as bad weather, break downs of the heating plant, caponizing and other infectious attacks like Newcastle, infectious bronchitis, coccidiosis and worm infestations.

The remedial measures suggested up to now for the control of this dreaded epidemic have proven to be of no value. Neither sulfa drugs nor the currently available antibiotics have shown any specific therapeutic activity against the disease, except that certain antibiotics have been helpful in limiting the incidence of secondary complications. At present only sanitary measures, such as complete clean-up after an outbreak and the strict avoidance of harmful environmental conditions have been proposed for protective purposes. They are, however, neither reliable nor effective. The preparation of an immunizing agent as a preventive has likewise been unsuccessful.

We have found that the virulent form of chronic respiratory disease or air sac infection in poultry can be most effectively controlled by a group of chemotherapeutic agents which show a surprising specificity against the pathogenic organisms of this disorder. Compounds of this type in accordance with our invention may best be characterized as para-substituted monocyclic carboxylic acids of the general configuration

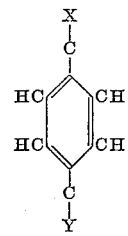

wherein X is a nitro-, amino-, hydroxy-, or halogen-group and Y represents a carboxylic acid radical of aliphatic or aromatic origin.

If X is amino, either one or both of the hydrogen atoms in $NH_2$ may be replaced by divers radicals without changing the therapeutic function of the structure. Such substituents may be illustrated by alkyl, aryl, aralkyl, acyl, and alkyl-amino portions. Likewise, if X is hydroxyl, the hydrogen in the OH radical may be replaced by aliphatic groups to form ether derivatives, such as ethoxy-, methoxy-, and other homologous combinations.

The carboxylic acid radical, represented by Y, may be derived from aliphatic or aromatic acids. Aliphatic residues may, for example, include acetic, propionic and butyric acid. The acidic portions may further be of the saturated or unsaturated type and belong to the mono- or poly-carboxylic series. A preferred species of the aliphatic group is formic acid with its radical —COOH which, when coupled with the benzene nucleus, forms benzoic acid. The carboxylic acid group may also be in its free reactive state, or it may be aminated or esterified. The ester moiety may include any aromatic or aliphatic radical of saturated or unsaturated structure. Likewise, the $NH_2$ group of the amide may be replaced by one or two alkyl or aryl substituents instead of the hydrogen atoms. The carboxylic acid portions may further be present in form of non toxic salt combinations. Salts of the type falling within the range of this invention comprise those of the alkali metals, ammonium, alkaline earth metals and other metallic elements of nontoxic properties.

As an additional variation a second formic acid radical may be introduced in ortho-position into the benzene ring of the benzoic acid to form phthalic acid and the para-substituted derivatives thereof shall also be included within the purview of this invention.

The aforementioned compounds have been found to be effective against air sac infection when administered by admixture, suspension or dispersion in the normal elements of sustenance ingested by fowl. These elements may include either water or feed normally partaken by the birds and the treatment may therefore be preferably carried out by administering to the birds a grain, mash, scratch, drinking solution, or other liquids medicated with the compounds of this invention.

The general dosage range of the therapeutic agents extends from approximately 0.1% to 5% by weight of the drug in the total animal ration. These concentrations, however, are subject to variations depending upon the particular compound used and its toxic characteristics. The tolerance for para-amino-benzoic acid, for instance, has been found to exceed 5% in the feed, while the toxic level for para-nitro-benzoic acid is reached at 1%. Likewise, parahydroxy-benzoic acid at a dosage of 1% shows no harmful effects on the birds.

The therapeutic activity of the drugs will be illustrated by the examples listed in the following table. The degree of efficacy is measured by the incidence of symptomatic manifestations characteristic of the disease and easily distinguishable by a distinct rasping cough, sneezing and a swelling of the nasal sinuses.

To induce the infection for experimental purposes, a chronic respiratory disease agent was cultivated in the yolk sac of six to seven day embryonating eggs. Four weeks old birds previously immunized against both bronchitis and Newcastle disease were infected intratracheally with one half of 1 cc. of yolk sac material. The inoculated birds were held for 15 days. The first respiratory symptoms appeared within approximately four to seven days.

Twenty infected birds were used for each experiment and divided into two groups of ten. One of them received medication in feed at the time of the infection, while the other was left untreated and served as control. The observation period was 15 days. The test results were evaluated by standard diagnostic procedures as are generally applied to affections of the respiratory tract, and the term "incidence of symptoms" appearing in Table I expresses the number of birds showing visible characteristic respiratory manifestations such as a rasping cough, gasping and sniffles.

The following figures show the degree of protection afforded to the groups subjected to medication:

Table I

| Compound | Dose in Feed % | Incidence of Symptoms in % | |
|---|---|---|---|
| | | Infected treated | Controls |
| p-amino-benzoic acid | 0.1 | 10 | 60 |
| | 0.1 | 10 | 50 |
| p-nitro-benzoic acid | 0.1 | 10 | 50 |
| | 0.1 | 10 | 60 |
| p-hydroxy-benzoic acid | 0.1 | 30 | 60 |
| | 0.1 | 20 | 60 |
| p-nitro-phenyl-acetic acid | 0.1 | 40 | 60 |
| ethyl-p-nitrobenzoate | 0.1 | 30 | 60 |
| allyl-p-nitrobenzoate | 0.1 | 30 | 60 |
| sodium-p-nitrobenzoate | 0.1 | 10 | 50 |
| p-amino-N-(2-diethyl-amino-ethyl)-benzamide hydrochloride | 0.1 | 30 | 60 |
| p-aceto-amino-benzoic acid | 0.1 | 30 | 60 |
| p-amino-benzamid | 0.1 | 20 | 60 |
| phthalic acid | 0.1 | 30 | 60 |
| 4-nitro-phthalic acid | 0.1 | 40 | 60 |
| salicylic acid | 0.1 | 40 | 60 |

In addition to the foregoing laboratory tests based on artificial infection, extensive field investigations were also conducted in broiler plants where the therapeutic effect of the drugs was observed under natural conditions of spontaneously occurring outbreaks. The test compound in all cases was p-amino-benzoic acid given in the feed at a ratio of 0.1% for a period of 5 days. The potency of the agent was checked either against unmedicated controls or the degree of protection afforded to the birds when treated with aureomycin dispended in a concentration of 80 grams per ton of feed. The rate of mortality over varying periods of observation was taken as the measure of therapeutic response.

In the following table the term of p-amino-benzoic acid will be abbreviated as PABA and aureomycin will be listed as AUR.

Table II

| Exp. No. | Group | No. Birds | Treatment | Duration (days) | Observation period (days) | Mortality percent |
|---|---|---|---|---|---|---|
| 1 | a | 1800 | PABA 0.1% | 5 | 19 | 5.2 |
| | b | 1200 | AUR 80 g/ton | 10 | | 8.9 |
| 2 | a | 1800 | PABA 0.1% | 5 | 19 | 2.5 |
| | b | 19200 | None | | | 4.6 |
| 3 | a | 1800 | None | | 8 | 9.9 |
| | b | 1800 | PABA 0.1% | 5 | | 1.39 |
| 4 | a | 1800 | None | | 10 | 8.3 |
| | b | 1800 | PABA 0.1% | 5 | | 0.8 |
| 5 | a | 1200 | None | | 21 | 10.7 |
| | b | 600 | PABA 0.1% | 5 | | 1.2 |
| 6 | a | 3500 | None | | 12 | 11.8 |
| | b | 3500 | PABA 0.1% | 5 | | 2.12 |
| | c | 2500 | PABA 0.1% | 5 | | 2.6 |

The summary of the foregoing data shows the high potency of p-amino-benzoic acid in protecting entire flocks against the lethal inroads of the disease. By administering the compound for a period of five days, it is possible to reduce mortality losses to 10–20% with the additional benefit that all the treated survivors remain in perfectly healthy condition and indicate no ill effects with respect to their normal growth and meat producing capacity. The drug likewise asserts its superiority over aureomycin as shown in Experiment 1. As previously stated, workers with this antibiotic have found that it has no specific action against virulent respiratory disease and may at best counteract adventitious disorders supervening upon the primary disease in an advanced stage of its development.

When the drug is administered in a drinking preparation, it is preferably supplied in form of a water soluble salt and tendered to the birds for imbibition ad libitum. A preferred embodiment of this mode of treatment is a drinking potion admixed with sodium para-aminobenzoate dissolved in varying concentrations.

While we have illustrated the efficacy of the para-substituted monocyclic carboxylic acids and their closely related derivatives by way of oral treatment in medicated feed and water, it will be understood that these are merely preferred embodiments of our invention and should not be construed as limiting its scope. It is, of course, apparent that the drugs are likewise administrable in many other equivalent ways, such as drinking water solutions or suspensions and other orally ingestible nontoxic liquids. Other formulations may consist of a suitable innocuous carrier such as is used in the preparation of capsules, tablets and granules, and containing the drug in therapeutically effective dosages. All these variations are obvious equivalents and included within the purview of the present invention and the claims.

What we claim is:

1. A process of treating air sac infection in fowl which comprises introducing into the intestinal tract of the bird infected with the causative agent of said disease a poultry feed containing approximately 0.1% of a compound selected from the group consisting of para-amino-benzoic acid, water soluble salts of para-amino-benzoic acid and mixtures thereof and maintaining said treatment for a period of not less than five days.

2. A process of treating air sac infection in fowl which comprises introducing into the intestinal tract of the bird infected with the causative agent of said disease a poultry feed containing approximately 0.1% of sodium-para-amino-benzoate and maintaining said treatment for a period of not less than five days.

References Cited in the file of this patent

UNITED STATES PATENTS

| | | |
|---|---|---|
| 2,403,473 | Ansbacher | July 9, 1946 |
| 2,512,537 | Zellers | June 20, 1950 |
| 2,608,483 | Hayes | Aug. 26, 1952 |
| 2,620,274 | Lewis | Dec. 2, 1952 |

OTHER REFERENCES

Marshall: Journal of Pharmacology and Experimental Therapeutics, vol. 75, September 1942, pages 89 to 104, particular page 102.

Maier: Proc. Soc. Exp. Biol. and Med. volume 50, pages 152 to 154 (1942). (Copy in Scientific Library.)

Seeler: Journal of Bacteriology, volume 45, pages 205 to 209 (March 1943). (Copy in Scientific Library.)

Ansbacher: Science, volume 93, pages 164 and 165 (February 14, 1941). (Copy in Scientific Library.)

Briggs: Proc. Exptl. Biol. Med., volume 52, pages 7 to 10 (January 1943.) (Copy in Scientific Library.)

Milks: Veterinary Pharmacology, Materia Medica and Therapeutics, 6th ed. (1949), pages 363, 365, 366. (Copy in Division 43.)